United States Patent
Perrone et al.

(10) Patent No.: US 12,392,323 B2
(45) Date of Patent: Aug. 19, 2025

(54) SYSTEM AND METHOD FOR IMPROVED EXTREME LOAD CONTROL FOR WIND TURBINE ROTOR BLADES

(71) Applicant: General Electric Renovables Espana S.L., Barcelona (ES)

(72) Inventors: Francesco Perrone, Norderstedt (DE); Leonardo Cesar Kammer, Schenectady, NY (US)

(73) Assignee: GE Vernova Renovables Espana, S.L., Barcelona (ES)

( * ) Notice: Subject to any disclaimer, the term of this patent is extended or adjusted under 35 U.S.C. 154(b) by 366 days.

(21) Appl. No.: 16/844,575

(22) Filed: Apr. 9, 2020

(65) Prior Publication Data
US 2021/0317818 A1  Oct. 14, 2021

(51) Int. Cl.
F03D 7/04 (2006.01)
F03D 7/02 (2006.01)
G01M 5/00 (2006.01)

(52) U.S. Cl.
CPC ........... F03D 7/042 (2013.01); F03D 7/0224 (2013.01); F03D 7/024 (2013.01); F03D 7/045 (2013.01);
(Continued)

(58) Field of Classification Search
CPC ........ F03D 7/0224; F03D 7/024; F03D 7/022; F03D 7/042; F03D 7/045; F03D 17/011;
(Continued)

(56) References Cited

U.S. PATENT DOCUMENTS

2011/0158806 A1  6/2011  Arms et al.
2016/0237988 A1  8/2016  Perley et al.
(Continued)

FOREIGN PATENT DOCUMENTS

CN 106368898 A 2/2017
EP 2626551 A2 8/2013
WO WO2018/233787 A1 12/2018

OTHER PUBLICATIONS

Korber, Arne, "Extreme and Fatigue Load Reducing Control for Wind Turbines: A Model Predictive Control Approach using Robust State Constraints," Apr. 28, 2014, p. 1-144.*
(Continued)

Primary Examiner — Christopher Verdier
(74) Attorney, Agent, or Firm — Dority & Manning, P.A.

(57) ABSTRACT

A method for reducing extreme loads acting on at least one rotor blade of a wind turbine includes calculating, via a processor, a flapwise bending moment of the rotor blade(s). Further, the method includes calculating, via the processor, an edgewise bending moment of the rotor blade(s). The method also includes calculating, via the processor, an average load envelope of a blade root bending moment of the rotor blade(s) as a function of the flapwise bending moment and the edgewise bending moment of the rotor blade(s). Moreover, the method includes calculating, via the processor, an overall load envelope of the blade root bending moment of the rotor blade(s) as a function of the average load envelope and a future load estimation of the blade root bending moment of the rotor blade(s). As such, the method also includes implementing, via the processor, a control action when the overall load envelope is above a certain threshold.

19 Claims, 11 Drawing Sheets

(52) U.S. Cl.
CPC ..... *G01M 5/0016* (2013.01); *F05B 2260/821* (2013.01); *F05B 2270/322* (2013.01); *F05B 2270/331* (2013.01); *F05B 2270/332* (2013.01)

(58) Field of Classification Search
CPC .......... F05B 2270/331; F05B 2270/332; F05B 2270/322; F05B 2260/821; G01M 5/0016
See application file for complete search history.

(56) References Cited

U.S. PATENT DOCUMENTS

| | | | | |
|---|---|---|---|---|
| 2017/0241404 | A1* | 8/2017 | Kristoffersen | F03D 7/042 |
| 2018/0135601 | A1* | 5/2018 | Caponetti | F03D 7/0224 |
| 2020/0378361 | A1* | 12/2020 | Hovgaard | F03D 7/02 |
| 2021/0123413 | A1* | 4/2021 | Vaddi | F03D 7/042 |
| 2021/0148336 | A1* | 5/2021 | Brodsgaard | F01D 25/00 |

OTHER PUBLICATIONS

"Direct-quadrature-zero transformation", Wikipedia article (no date).*
European Search Report for EP Application No. 21165673.1, mail date Sep. 7, 2021.
Stotsky, Alexander et al., Proactive control of wind turbine with blade load constraints, Institution of Mechanical Engineers, Proceeding, Part I: Journal of Systems and Control Engineering, vol. 226, No. 7, Aug. 1, 2012, pp. 985-993.
U.S. Appl. No. 16/662,487 filed Oct. 24, 2019.
Petrovic et al., Identification of Wind Turbine Model for Individual Pitch Controller Design, Universities Power Engineering Conference, Oct. 2008.

* cited by examiner

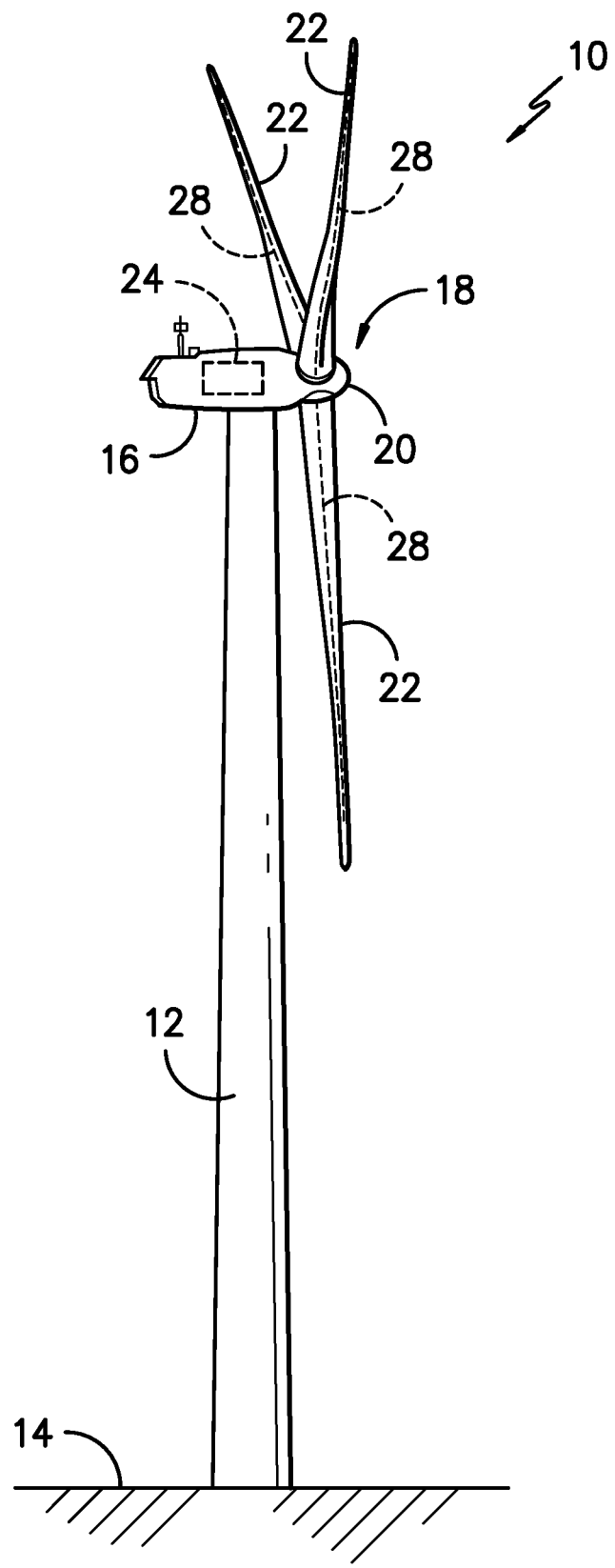
FIG. -1-

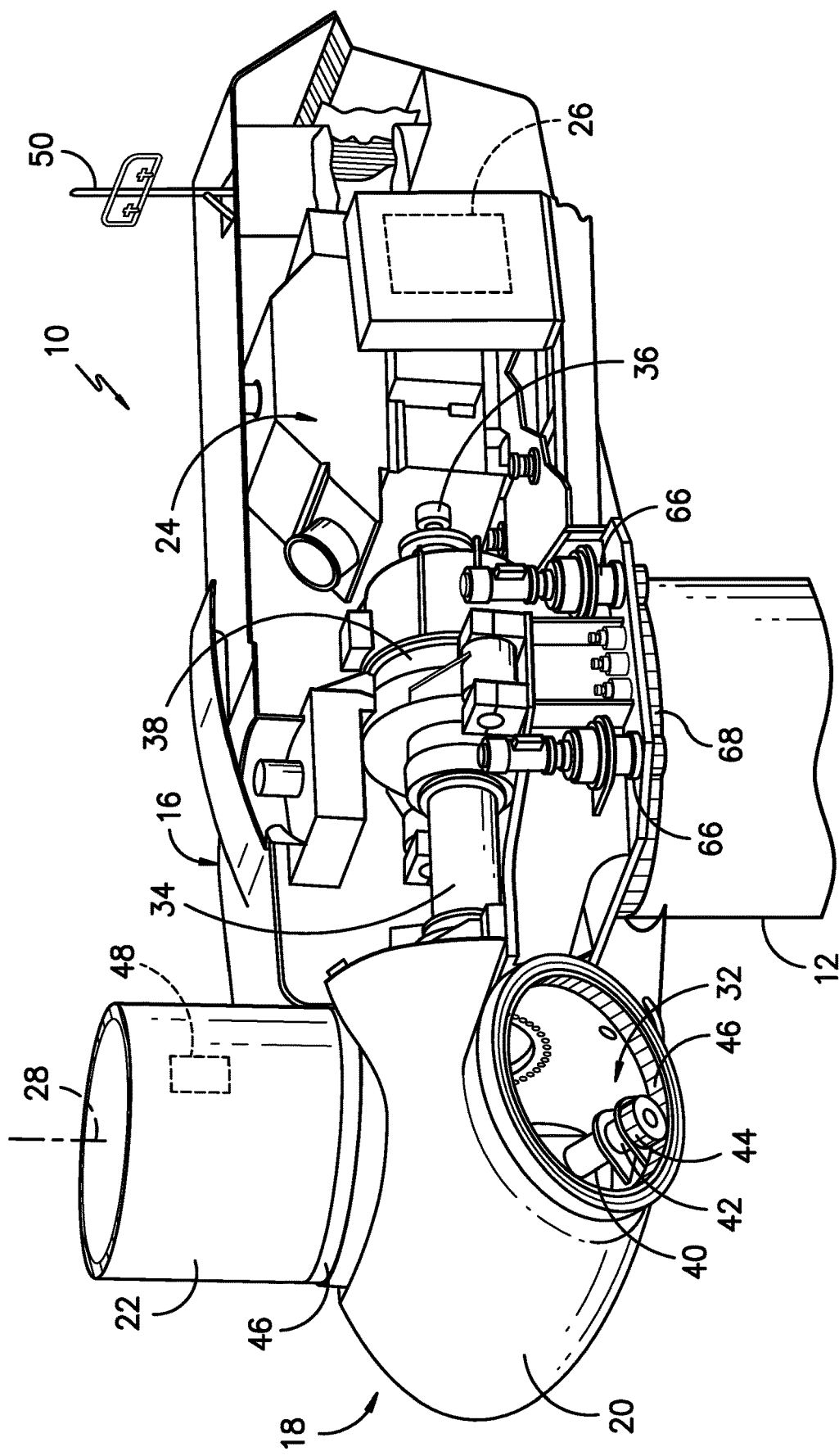
FIG. -2-

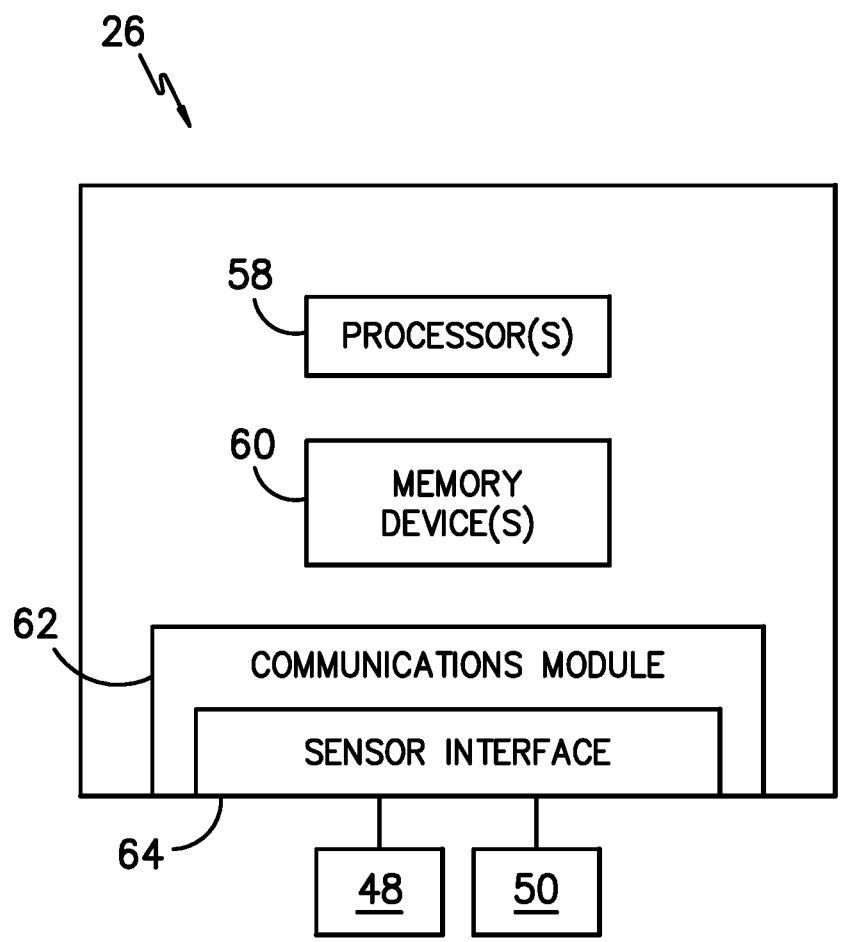
FIG. -3-

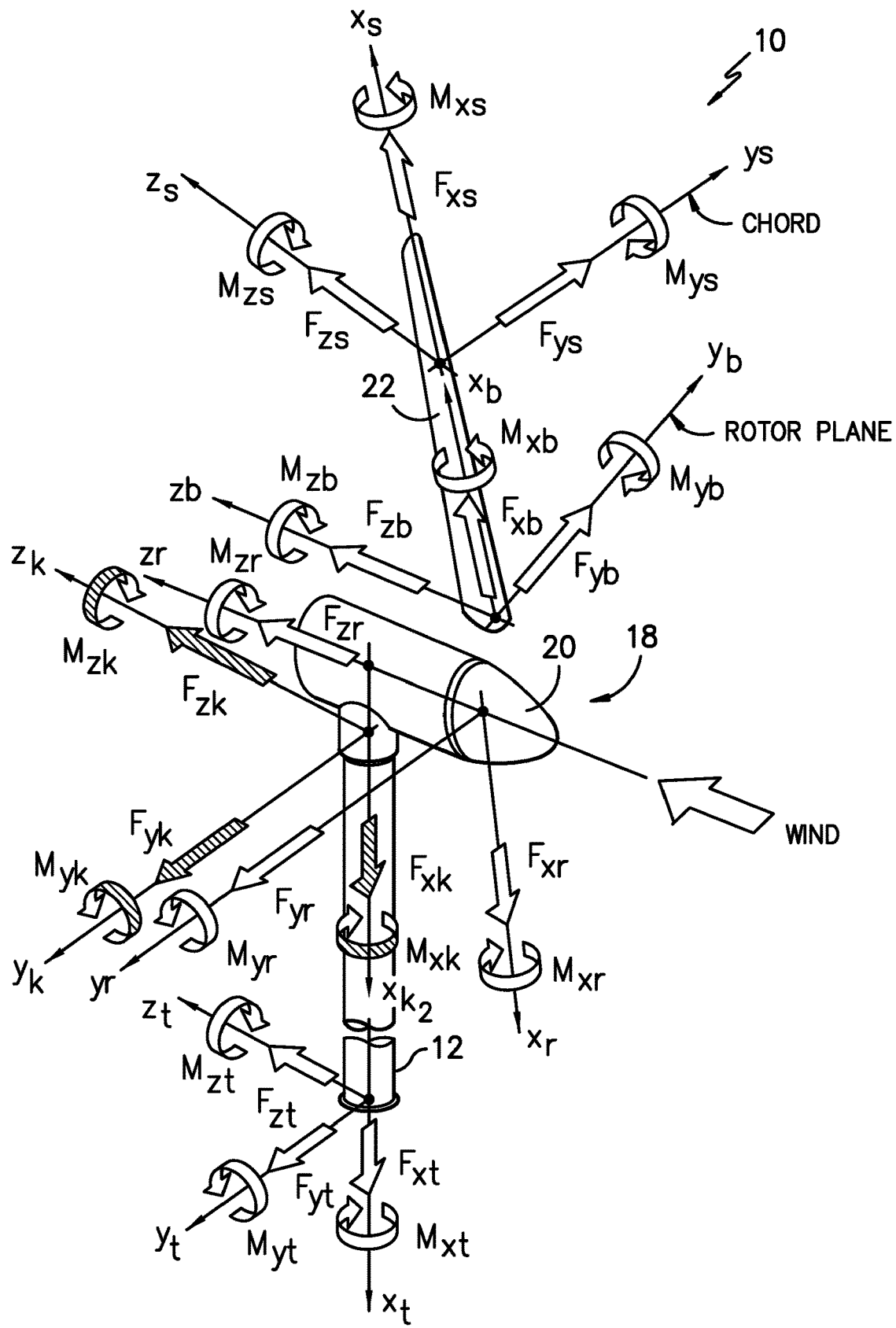
FIG. -4-

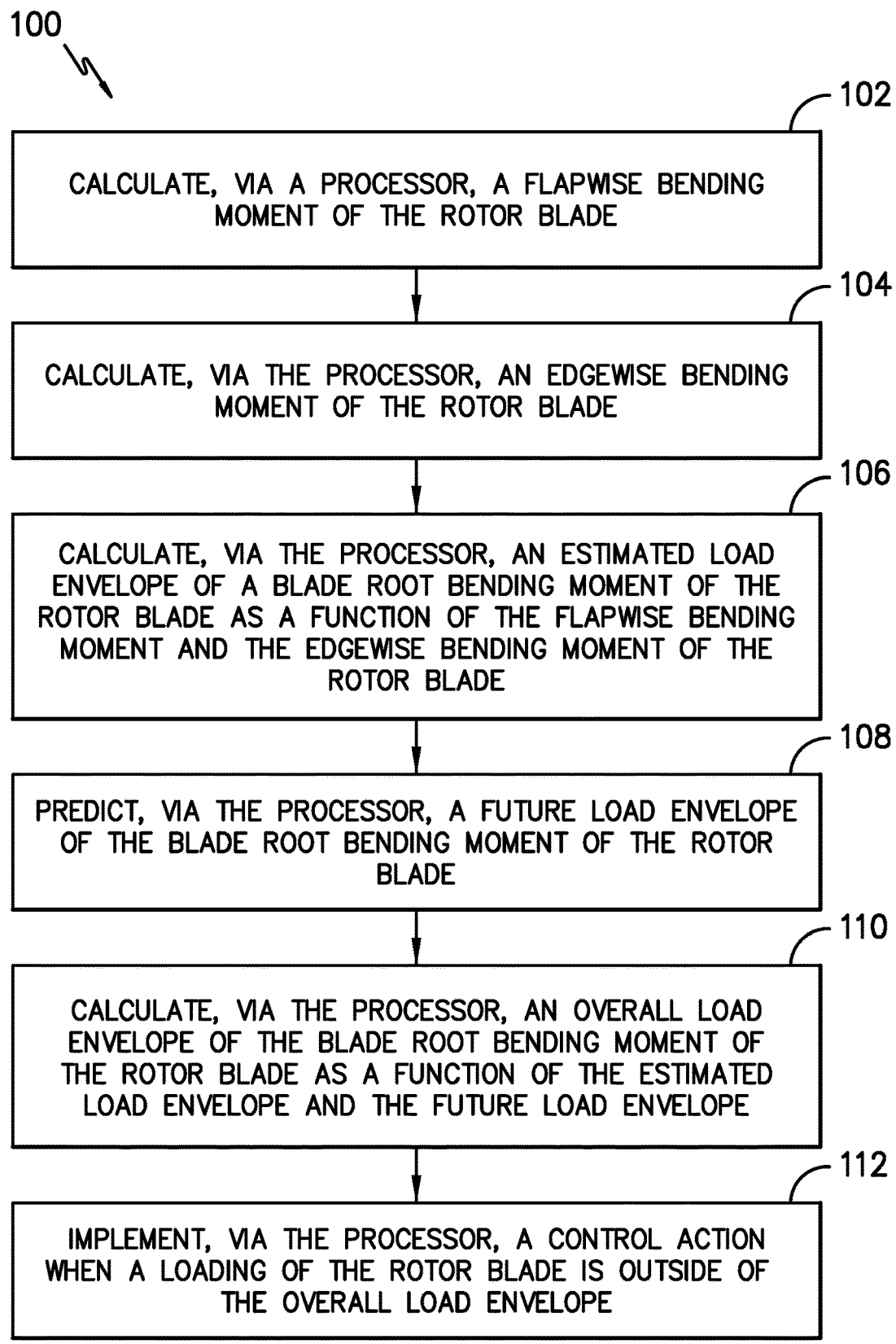
FIG. -5-

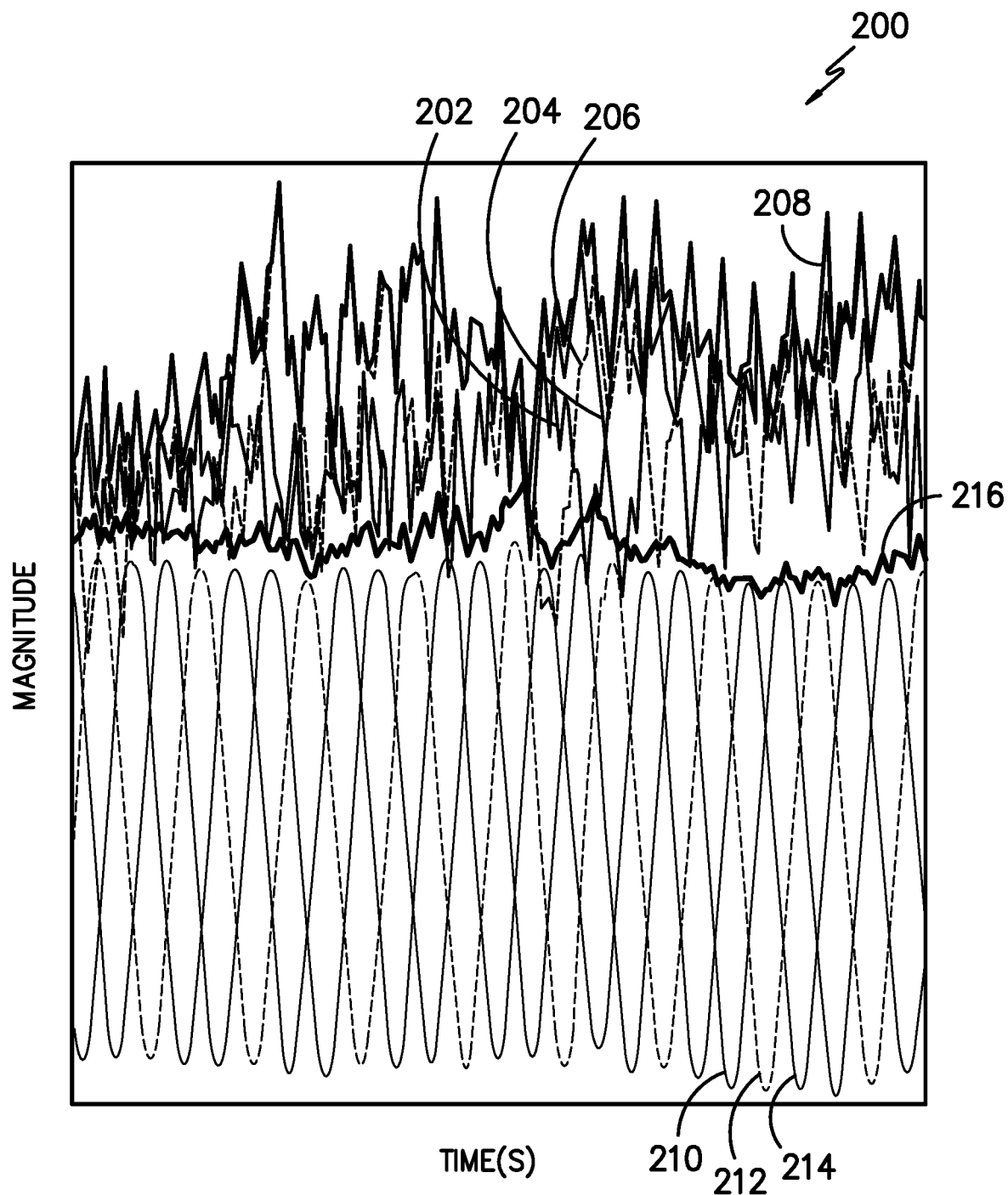
FIG. -6-

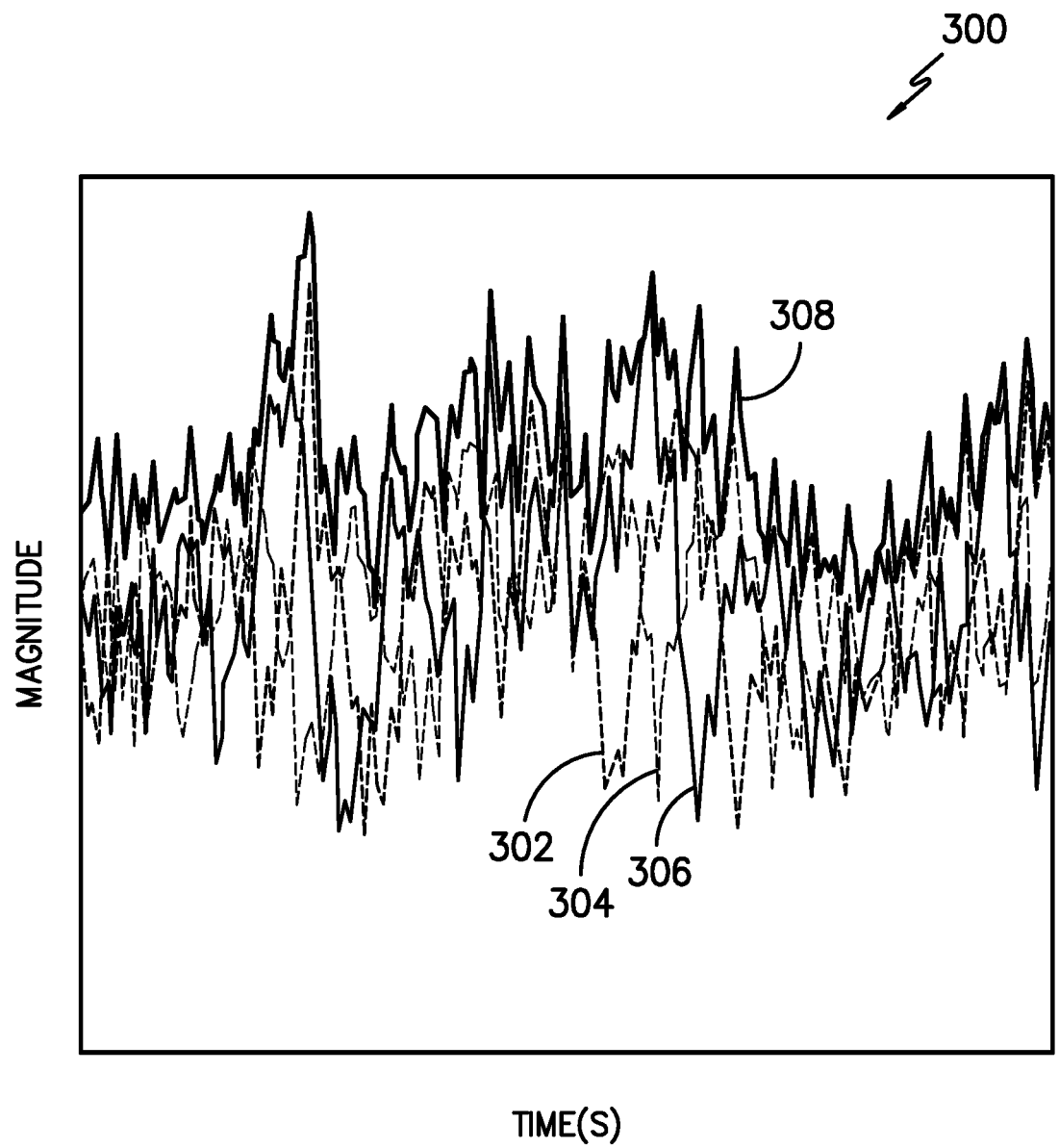
FIG. -7-

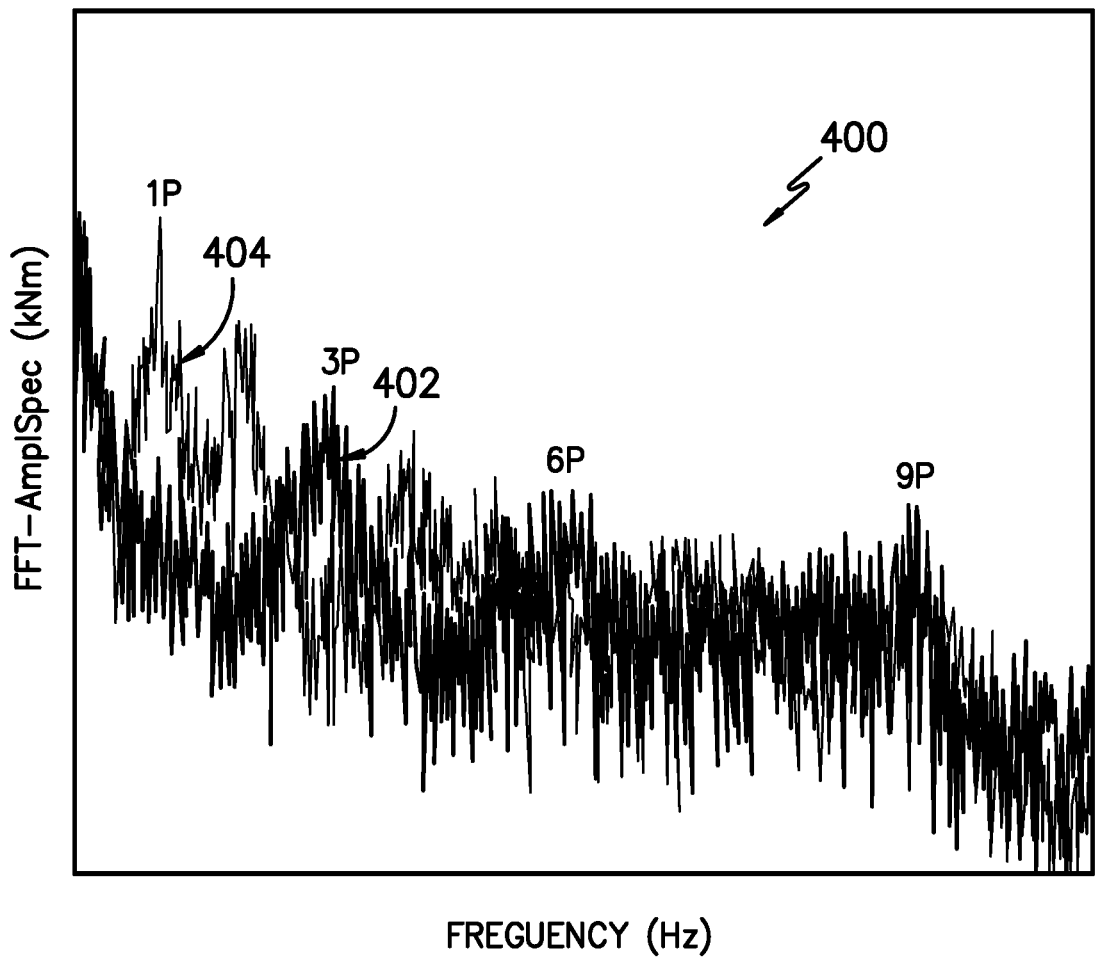
FIG. -8-
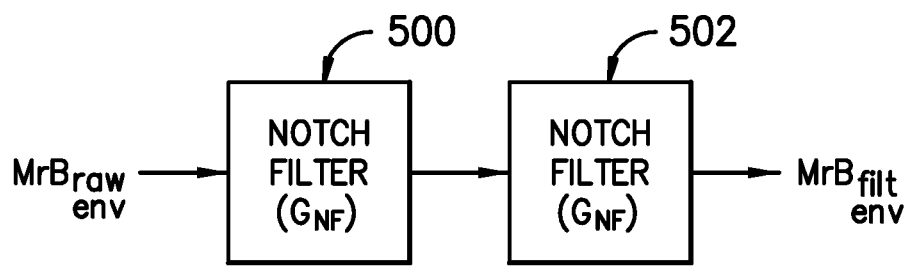
FIG. -9-

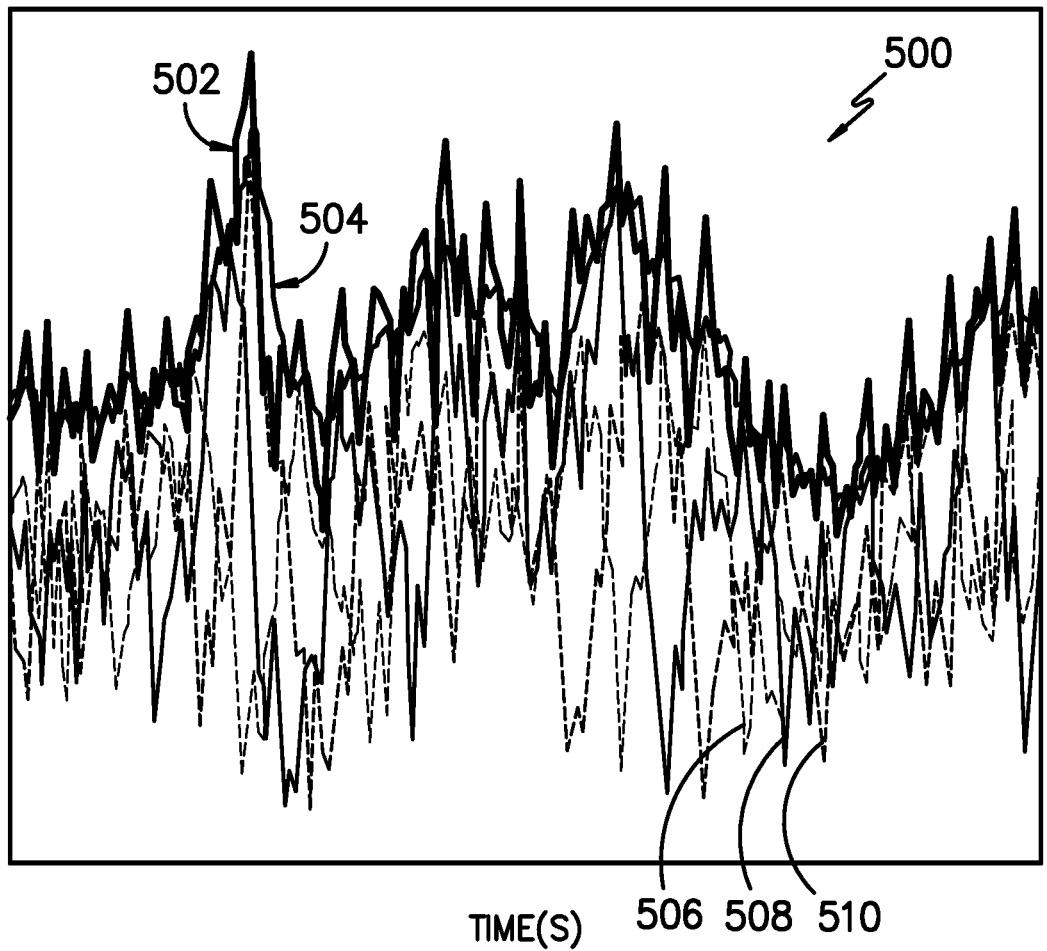
FIG. -10-

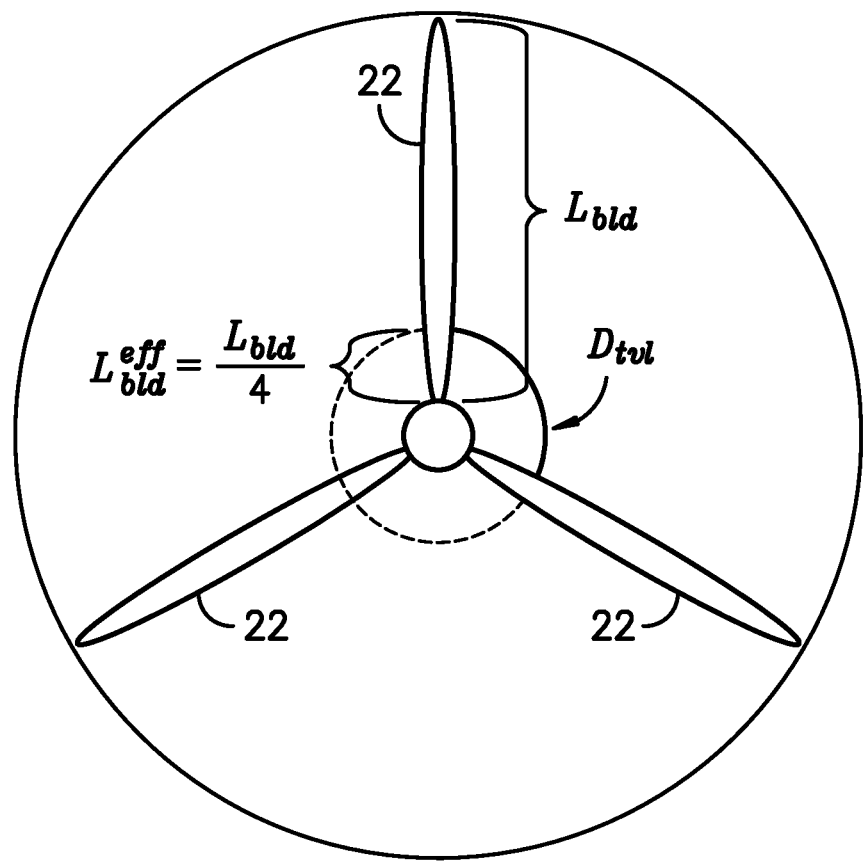
FIG. -11-
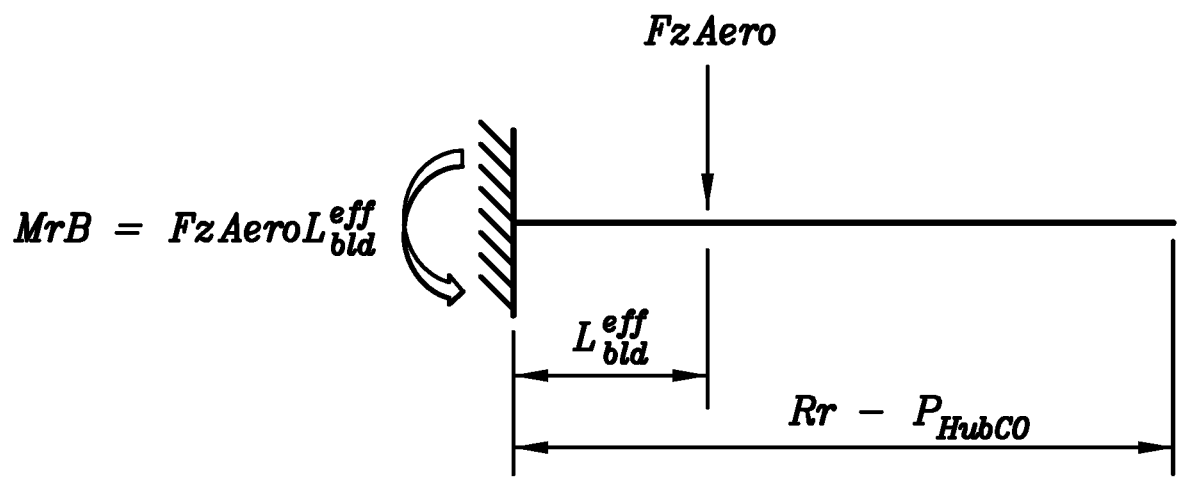
FIG. -12-

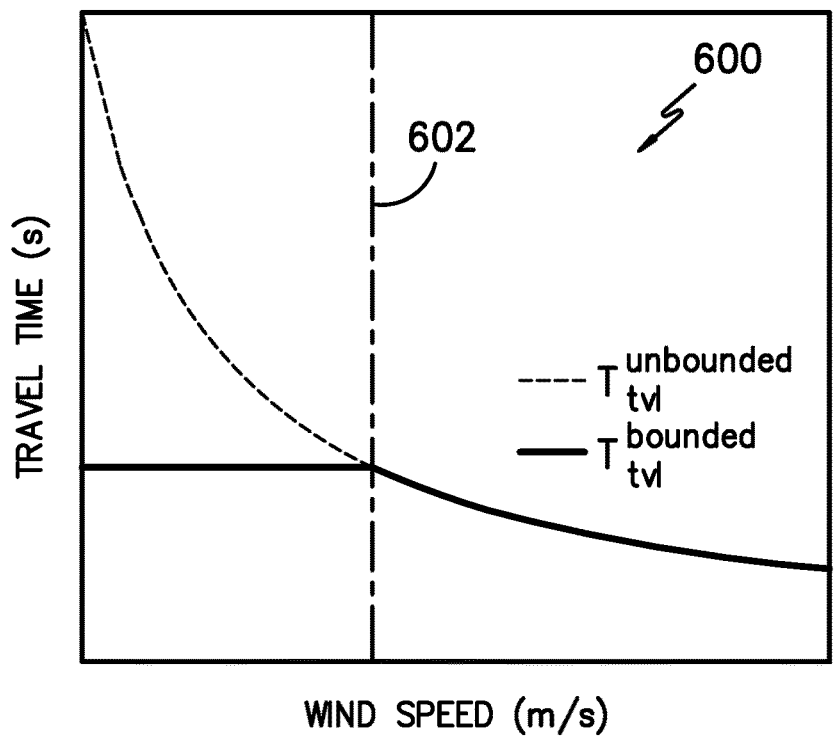
FIG. -13-
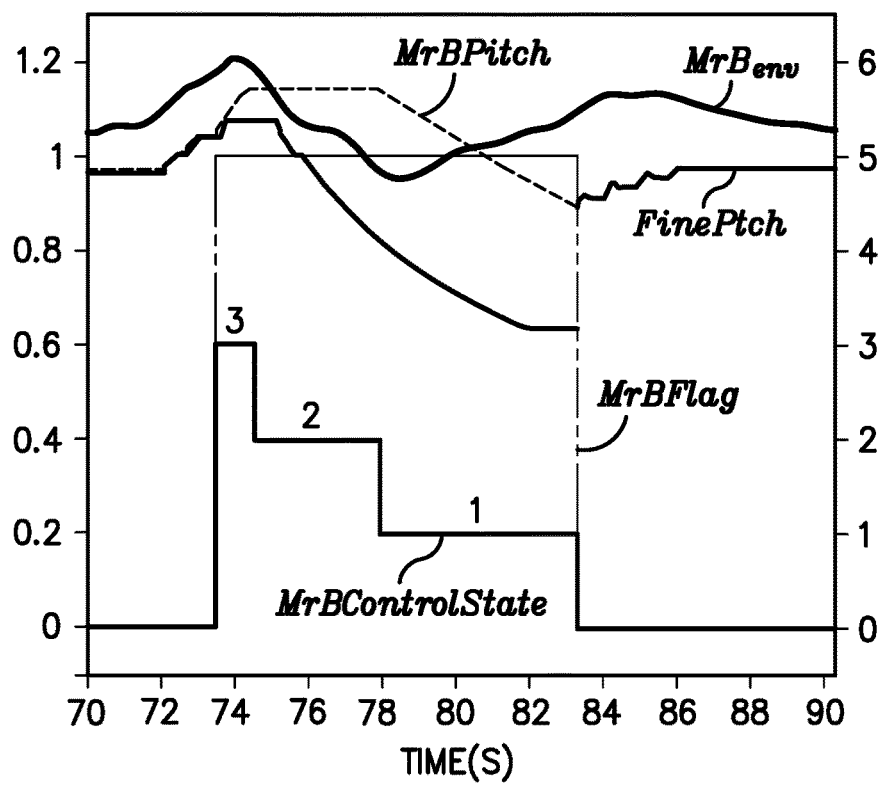
FIG. -14-

SYSTEM AND METHOD FOR IMPROVED EXTREME LOAD CONTROL FOR WIND TURBINE ROTOR BLADES

FIELD

The present subject matter relates generally to wind turbines and, more particularly, to a system and method for improving extreme load control for wind turbine components, such as rotor blades.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

The amount of power that may be produced by a wind turbine is typically limited by structural limitations (i.e. design loads) of the individual wind turbine components. For example, the blade root of a wind turbine may experience loads (e.g. a blade root resultant moment) associated with both average loading due to turbine operation and dynamically fluctuating loads due to environmental conditions. Such loading may damage turbine components, thereby eventually causing the turbine components to fail. The fluctuating loads can change day-to-day or season-to-season and may be based on wind speed, wind peaks, wind turbulence, wind shear, changes in wind direction, density in the air, yaw misalignment, upflow, or similar. Specifically, for example, loads experienced by a wind turbine may vary with wind speed.

As such, it is imperative to ensure loads acting on the wind turbine do not exceed design loads. Thus, many wind turbines employ one or more sensors configured to measure the loads acting on the various wind turbine components. Though the sensors may provide the desired information, new sensor systems can be complex and expensive to install. Further, the sensors may provide inaccurate information and can be prone to fail.

Additionally, wind turbines utilize control systems configured to estimate loads acting on the wind turbine based on a wind turbine thrust. The terms "thrust," "thrust value," "thrust parameter" or similar as used herein are meant to encompass a force acting on the wind turbine due to the wind. The thrust force comes from a change in pressure as the wind passes the wind turbine and slows down. Such control strategies estimate loads acting on the wind turbine by determining an estimated thrust using a plurality of turbine operating conditions, such as, for example, pitch angle, power output, generator speed, and air density. The operating conditions are inputs for the algorithm, which includes a series of equations, one or more aerodynamic performance maps, and one or more look-up tables (LUTs). For example, the LUT may be representative of a wind turbine thrust. A +/- standard deviation of the estimated thrust may also be calculated, along with an operational maximum thrust and a thrust limit. As such, the wind turbine may be controlled based on a difference between the maximum thrust and the thrust limit.

In view of the foregoing, the art is continuously seeking new and improved systems for controlling extreme loads of wind turbine components, such as rotor blades, that address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for reducing loads, such as extreme loads, acting on at least one rotor blade of a wind turbine. The method includes calculating, via a processor, a flapwise bending moment of the rotor blade(s). Further, the method includes calculating, via the processor, an edgewise bending moment of the rotor blade(s). The method also includes calculating, via the processor, an average load envelope of a blade root bending moment of the rotor blade(s) as a function of the flapwise bending moment and the edgewise bending moment of the rotor blade(s). Moreover, the method includes rotor blade(s) calculating, via the processor, an overall load envelope of the blade root bending moment of the rotor blade(s) as a function of the average load envelope and a future load estimation of the blade root bending moment of the rotor blade(s). As such, the method also includes implementing, via the processor, a control action when the overall load envelope is above a certain threshold.

In an embodiment, calculating the flapwise bending moment may include calculating the flapwise bending moment as a function of an equivalent thrust acting on a rotor of the wind turbine and an overall length of the rotor blade(s). Further, in an embodiment, the method may include calculating the equivalent thrust acting on the rotor as a function of a thrust force, a rotor radius, and one or more processor variables, the one or more processor variables comprising at least one of a hub loading sensor measurement, d-q coordinate moments, or an aerodynamic location of where the thrust force is applied on the rotor blade(s).

In another embodiment, calculating the edgewise bending moment may include calculating the edgewise bending moment as a function of two or more of the following parameters: a mass of the rotor blade(s), an acceleration due to gravity, a location of a center of gravity of the rotor blade(s), a hub connection distance, a low-speed-shaft mechanical torque, a rotor radius, a partial derivative of a rotor rotation with respect to time, and a rotor inertia.

In further embodiments, calculating the average load envelope of the blade root bending moment as a function of the flapwise bending moment and the edgewise bending moment may include summing the squares of the flapwise bending moment and the edgewise bending moment and calculating the square root of the sum of the squares.

In additional embodiments, the method may include filtering the average load envelope of the blade root bending moment via at least one filter. More specifically, in an embodiment, filtering the average load envelope of the blade root bending moment via the at least one filter may include filtering the average load envelope of the blade root bending moment via two notch filters. For example, in an embodiment, the two notch filters may be characterized by the transfer function that includes a gain attenuation, a damping factor, and a target frequency of the notch filters.

In yet another embodiment, the method may include predicting the future load estimation of the blade root bending moment by calculating a future load envelope of the blade root bending moment as a function of one or more partial derivatives of thrust with respect to wind speed and rotor speed, an effective length of the rotor blade(s), and a travel time, the travel time equal to the shortest time required for an extreme blade root bending moment event on any rotor blade(s) of the wind turbine to travel downstream of a rotor plane to ensure the following rotor blade(s) is not impacted, the effective blade length corresponding to a location where an application of aerodynamic thrust produces a given blade root bending moment.

In several embodiments, the method may also include calculating the travel time as a function of a distance being traveled by wind downstream of a rotor of the wind turbine after any of the rotor blades has experienced the extreme blade root bending moment event and an estimated wind speed.

In further embodiments, calculating the overall load envelope of the blade root bending moment as a function of the average load envelope and the future load estimation may include summing the average load envelope and the future load estimation.

In particular embodiments, the method may also include calculating the aerodynamic thrust that produces the given blade root bending moment at the effective blade length and determining a distance between the aerodynamic thrust and a corresponding threshold. Thus, in such embodiments, the method may include determining the control action based upon the distance between the aerodynamic thrust and the corresponding threshold and a hysteresis band.

In certain embodiments, the control action, as an example, may include pitching one or more rotor blades of the wind turbine. More specifically, in an embodiment, pitching the one or more rotor blades may include at least one of collective pitching of a plurality of rotor blades of the wind turbine, independently pitching each of the plurality of rotor blades, cyclically pitching each of the plurality of rotor blades, fine pitching each of the plurality of rotor blades, or combinations thereof.

In another aspect, the present disclosure is directed to a system for reducing loads, such as extreme loads, acting on a rotor blade of a wind turbine. The system includes a controller having at least one processor configured to perform a plurality of operations. The plurality of operations may include but are not limited to calculating a flapwise bending moment of the rotor blade, calculating an edgewise bending moment of the rotor blade, calculating an average load envelope of a blade root bending moment of the rotor blade as a function of the flapwise bending moment and the edgewise bending moment of the rotor blade, filtering the average load envelope of the blade root bending moment via at least one filter, calculating an overall load envelope of the blade root bending moment of the rotor blade as a function of the average load envelope and a future load estimation of the blade root bending moment of the rotor blade, and implementing a control action when the overall load envelope is above a certain threshold. It should be further understood that the system may include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a simplified, internal view of one embodiment of a nacelle of a wind turbine according to the present disclosure;

FIG. 3 illustrates a schematic diagram of one embodiment of a controller according to the present disclosure;

FIG. 4 illustrates a perspective view of one embodiment of a wind turbine according to the present disclosure, particularly illustrating various axes of rotation and corresponding forces and moments acting on the wind turbine;

FIG. 5 illustrates a flow diagram of one embodiment of a method for reducing extreme loads acting on a rotor blade of a wind turbine according to the present disclosure;

FIG. 6 illustrates a graph of one embodiment of the estimated MzB1, MzB2 and MzB3 and its respective envelope $MzB_{env}$ and the estimated MyB1, MyB2 and MyB3 and its respective envelope $MyB_{env}$ according to the present disclosure;

FIG. 7 illustrates one embodiment of an equivalent plot of MrB1, MrB2 and MrB3 and the respective raw envelope $M_{env}^{raw}$ according to the present disclosure;

FIG. 8 illustrates a graph of one embodiment of the MrB envelope power spectral density according to the present disclosure;

FIG. 9 illustrates a schematic diagram of one embodiment of the MrB envelope according to the present disclosure being filtered via two notch filters;

FIG. 10 illustrates a graph of one embodiment of the estimated MrB envelope, particularly illustrating the raw MrB envelope compared to the filtered MrB envelope according to the present disclosure;

FIG. 11 illustrates a schematic diagram of one embodiment of a rotor of the wind turbine according to the present disclosure, particularly illustrating the travel distance $D_{tvi}$;

FIG. 12 illustrates a schematic diagram of one embodiment of a rotor blade represented as a cantilever beam excited at the tip by the thrust force FzAero and particularly illustrating the effective blade length $L_{bld}^{eff}$;

FIG. 13 illustrates a graph of one embodiment of the travel time (y-axis) versus time (x-axis) according to the present disclosure, particularly illustrating the constrained travel time; and FIG. 14 illustrates a graph of one embodiment of the functional behavior of envelope-based MrB control according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved systems and methods for improved extreme load control for wind turbine components, such as the rotor blades. More specifically, the method aims to use an envelope-based blade root bending moment control algorithm. Such control strategy includes multiple sub-elements, including but not limited to the extraction of the blade root bending moment load envelope, a state machine, and a control action. Accordingly, the blade root bending moment envelope extraction described herein provides a framework that detects the instantaneous envelope of the blade root moments for each rotor blade for determining the blade root bending moment load envelope that can be used in the envelope-based control of the wind turbine. The envelope detection algorithm encompasses, at least, the extraction of the raw blade root bending moment envelope, a filtering process to remove unwanted frequency components from the raw blade root bending moment envelope, and the computation of a predicted or look-ahead envelope component to provide the algorithm with preview capabilities.

Referring now to FIG. 1, a perspective view of one embodiment of a wind turbine 10 that may implement the control technology according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rate the wind turbine, and/or control various components of the wind turbine 10 as will be discussed in more detail below.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Still referring to FIG. 2, the wind turbine 10 may also include one or more sensors 48, 50 for measuring various operating parameters that may be required to various blade moments as described in more detail below. For example, in various embodiments, the sensors may include blade sensors 48 for measuring a pitch angle of one of the rotor blades 22 or for measuring a load acting on one of the rotor blades 22; generator sensors (not shown) for monitoring the generator 24 (e.g. torque, rotational speed, acceleration and/or the power output); sensors for measuring the imbalance loading in the rotor (e.g. main shaft bending sensors); and/or various wind sensors 50 for measuring various wind parameters, such as wind speed, wind peaks, wind turbulence, wind shear, changes in wind direction, air density, or similar. Further, the sensors may be located near the ground of the wind turbine, on the nacelle, or on a meteorological mast of the wind turbine. It should also be understood that any other number or type of sensors may be employed and at any location. For example, the sensors may be Micro Inertial Measurement Units (MIMUs), strain gauges, accelerometers, pressure sensors, angle of attack sensors, vibration sensors, proximity sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors may be configured to provide a direct measurement of the parameters being monitored or an indirect measurement of such parameters. Thus, the sensors may, for example, be used to generate signals relating to the parameter being monitored, which can then be utilized by the controller 26 to determine the actual parameter.

Referring now to FIG. 3, there is illustrated a block diagram of one embodiment of various components of the controller 26 according to the present disclosure. As shown, the controller 26 may include one or more processor(s) 58 and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50 to be converted into signals that can be understood and processed by the processors 58. It should be appreciated that the sensors 48, 50 may be communicatively coupled to the communications module 62 using any suitable means. For example, as shown in FIG. 3, the sensors 48, 50 are coupled to the sensor interface 64 via a wired connection. However, in other embodiments, the sensors 48, 50 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more current wind turbine parameters of the wind turbine 10 based on the plurality of operating data, determining a maximum wind turbine parameter, transmitting suitable control signals to implement control actions to reduce loads acting on the wind turbine, and various other suitable computer-implemented functions.

As shown in FIG. 4, an exploded view of one embodiment of the wind turbine 10 is shown, particularly illustrating various axes of rotation and corresponding forces and moments acting on the wind turbine 10. The peak loads of the wind turbine 10 may vary between turbines, but in general, typically correspond to at least one of the following: the blade root resultant moment (e.g. $M_{rB}$, which includes pitch and hub loads $M_{xB}$, $M_{yb}$, and $M_{zb}$), main shaft loads (e.g. $M_{yr}$, $M_{zr}$), main bearing loads (e.g. $M_{xr}$, $M_{yr}$), yaw drive loads (e.g. $M_{xk}$), yaw bolts/bearing/flange loads (e.g. $M_{yk}$, $M_{zk}$) or tower bending loads (e.g. $M_{xt}$, $M_{yt}$, and $M_{zt}$). It should be understood that the peak loads as described herein may also include any additional loads experienced by the wind turbine 10 and that the loads illustrated in FIG. 4 are provided for example purposes only. Calculations of such forces and moments are further described herein.

Referring now to FIG. 5, a flow diagram of method 100 for reducing extreme loads acting on a component of a wind turbine according to one embodiment of the present disclosure is illustrated. In an embodiment, for example, the component may include, for example, one or more of the rotor blades 22, the pitch bearing 46, or the hub 20 of the wind turbine 10. The method 100 is described herein as implemented using, for example, the wind turbine 10 described above. However, it should be appreciated that the disclosed method 100 may be implemented using any other suitable wind turbine now known or later developed in the art. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (102), the method 100 includes calculating, via the processor(s) 58, a flapwise bending moment (e.g. $MyB_{env}$) of one or more of the rotor blades 22. For example, in an embodiment, the processor(s) 58 may calculate the flapwise bending moment of the rotor blade(s) 22 as a function of an equivalent thrust (e.g. $F_r$) acting on the rotor 18 and an overall length of the rotor blade(s) 22 (e.g. $Rr-P_{HubCO}$) e.g. using Equation (1) below:

$$MyB_{env} = F_r * (P_{OPAeroLoc} * Rr - P_{HubCO}) \qquad \text{Equation (1)}$$

Where $P_{OPAeroLoc}$ is the aerodynamic location of where the force Fr is applied on the rotor blade(s) 22, Rr is the rotor radius, and $P_{HubCO}$ is the length of the hub connection.

Further, in an embodiment, the method 100 may include calculating the equivalent thrust $F_r$ acting on the rotor 18 as a function of a thrust force, a rotor radius, and one or more processor variables. More specifically, in an embodiment, the processor variable(s) may include a hub loading sensor measurement, d-q coordinate moments, or an aerodynamic location of where the thrust force is applied on the rotor blade(s) 22. Thus, in such embodiments, the processor(s) 58 is configured to calculate the equivalent thrust $F_r$ using Equation (2) below:

$$F_r = \frac{FzAero + 2 * \sqrt{D_{LessGravity}^2 + Parks_{Q_{act}}^2} \Big/ (P_{OPAeroLoc} * Rr)}{3} \qquad \text{Equation (2)}$$

Where FzAero is the thrust force, and $D_{LessGravity}$ is the D moment from the processor(s) 58, typically determined via one or more sensors and $Parks_{Q_{act}}^2$ is the Q moment from the processor(s) 58, typically determined via one or more sensors.

Still referring to FIG. 5, as shown at (104), the method 100 further includes calculating, via the processor(s) 58, an edgewise bending moment ($MzB_{env}$) of the rotor blade(s) 22. More specifically, in an embodiment, the processor(s) 58 is configured to calculate the edgewise bending moment of the rotor blade(s) 22 as a function of two or more of the following parameters: a mass of the rotor blade(s) 22, an acceleration due to gravity, a location of a center of gravity of the rotor blade(s) 22, a hub connection distance, a low-speed-shaft mechanical torque, a rotor radius, a partial derivative of a rotor rotation with respect to time, and a rotor inertia. Thus, in particular embodiments, the processor(s) 58 is configured to calculate the edgewise bending moment of the rotor blade(s) 22 using Equation (3) below:

$$MzB_{env} = P_{BladeMass} * -SG * (P_{CMloc} - P_{HubCO}) + \frac{LSSMechTrq}{3} * \frac{(Rr - P_{HubCO})}{Rr} + \frac{dWr * P_{Jr}}{3}$$

Equation (3)

Where $P_{BladeMass}$ is the blade mass,
SG is the acceleration due to gravity,
$P_{CMloc}$ is a location of a center of gravity of the rotor blade(s) 22,
LSSMechTrq is a low-speed-shaft mechanical torque,
dWr is a partial derivative of the rotor rotation with respect to time, and
PJr is the rotor inertia.

As shown at (106), the method 100 further includes calculating, via the processor(s) 58, an average load envelope of a blade root bending moment of the rotor blade(s) 22 as a function of the flapwise bending moment and the edgewise bending moment of the rotor blade(s) 22. More specifically, in an embodiment, the processor(s) 58 is configured to calculate the average load envelope by summing the squares of the flapwise bending moment and the edgewise bending moment and calculating the square root of the sum of the squares, as shown in Equation (4) below.

$$MrB_{env}^{raw} = \sqrt{MyB_{env}^2 + MzB_{env}^2}$$

Equation (4)

Referring particularly to FIGS. 6 and 7, FIG. 6 illustrates an example graph 200 of the estimated MzB1, MzB2 and MzB3 202, 204, 206 for three rotor blades and its envelope $MyB_{env}$ 208. Further, as shown, the graph illustrates estimated MyB1, MyB2 and MyB3 210, 212, 214 and its respective envelope $MxB_{env}$ 216. FIG. 7 illustrates an equivalent plot 300 of MrB1, MrB2 and MrB3 302, 304, 306 and the respective raw envelope $MrB_{env}^{raw}$ 308.

To better understand the frequency content carried by the raw MrB envelope (e.g. as illustrated in FIG. 7), a spectral density analysis can be performed. For example, as shown in FIG. 8, in an embodiment, the raw MrB estimated envelope 402 is dominated by the 3P component, with lesser peaks at 6P and 9P. These higher harmonics may become less (respectively, more) noticeable in presence (respectively, absence) of wind misalignment. In contrast, however, the single blade MrB estimate 404 is generally dominated by the 1P and blade flap frequency components. Such a frequency shifting generally occurs because the envelope carries the average frequency content of the three rotor blades. In this case, the 1P frequency is shifted by the number of blades, i.e. to 3P. This is called the "aggregation phenomenon" and may be typical of the envelope extraction.

Given these results, the envelope-based MrB control of the present disclosure should be less sensitive to changes of (at least) the 3P and (additionally) the 6P harmonics so as to reduce the controller response to rotor rotation driven MrB excitation. Moreover, given the limited frequency bandwidth typical of the pitch system, there is no clear benefit in extending such frequency rejection to harmonics higher than 6P. Accordingly, mitigation of the 3P and 6P harmonics is accomplished through filtering the average load envelope of the blade root bending moment via at least one filter. More specifically, in an embodiment, as shown in FIG. 9, the processor(s) 58 may filter the average load envelope of the blade root bending moment via one or more notch filters, such as two notch filters 500, 502. For example, in an embodiment, the notch filter(s) 500, 502 may be characterized by the transfer function of Equation (5) below:

$$G_{NF}(s) = \frac{s^2 + 2gd\omega_n s + \omega_n^2}{s^2 + 2d\omega_n s + \omega_n^2}$$

Equation (5)

where g is the gain attenuation,
d is the damping factor, and
$\omega_n$ is the target frequency of the filter(s) 500, 502.

In certain embodiments, the attenuation level g can be set equal to 0.25 (i.e. only 25% of original frequency content at $\omega_n$ will be kept) and d can be set to be 0.707 for both the 3P and 6P notch filters. Both parameters can be selected to provide the best possible attenuation and the least delay. Further, such parameters may or may not be turbine specific. An example of a graph 500 of one embodiment of the filtered envelope is shown in FIG. 10, with the raw MrB envelope being labeled 502 and the envelope after application of both notch filters at 3P and 6P being labeled 504. MrB1, MrB2, and MrB3 of the respective rotor blades are labeled as 506, 508, and 510, respectively.

Referring back to FIG. 5, as shown at (108), the method 100 also includes predicting, via the processor(s) 58, a future load estimation of the blade root bending moment of the rotor blade(s) 22. For example, in an embodiment, the processor(s) 58 may calculate a future load envelope of the blade root bending moment as a function of one or more partial derivatives of thrust with respect to wind speed and rotor speed, an effective length of the rotor blade, and a travel time, the travel time equal to the shortest time required for an extreme blade root bending moment event on any rotor blade of the wind turbine to travel downstream of a rotor plane to ensure the following rotor blade is not impacted, the effective blade length corresponding to a location where an application of aerodynamic thrust produces a given blade root bending moment.

Accordingly, predictive or look-ahead capability can be added to the envelope before being routed through to the control algorithm described herein. For example, in such embodiments, by using knowledge available from partial derivatives of the thrust with respect to wind speed and rotor speed, the processor(s) 58 can calculate a travel distance $T_{tvl}$ using Equation (6) below:

$$T_{tvl} = \frac{D_{tvl}}{\hat{V}_w}$$

Equation (6)

where $D_{tvl}$ is the distance being traveled by the wind downstream of the rotor 18 after any of the rotor blades 22 has experienced an extreme MrB event, and
$\hat{V}_W$ is the estimated wind speed.

More specifically, as shown in FIG. 11, the travel distance $D_{tvl}$ generally refers to the distance between two adjacent blades 22 at the effective blade length, $L_{bld}^{eff}$ and can be calculated using Equation (7) below:

$$D_{tvl} = \frac{2\pi L_{bld}^{eff}}{3}$$

Equation (7)

Moreover, assuming the rotor blade(s) 22 is a cantilever beam excited at the tip by the thrust force FzAero, static beam theory suggests the effective blade length is a fourth of the full blade length as represented by Equation (8):

$$L_{bld}^{eff} = \frac{L_{bld}}{4} = \frac{R_r - P_{HubCO}}{4} \qquad \text{Equation (8)}$$

where $R_r - P_{HubCO}$ is the overall blade length, and $L_{bld}$ is the length of one of the rotor blades 22.

Hence, in such embodiments, the effective blade length is the location where the application of the aerodynamic thrust produces the given MrB blade root moment. FIG. 12 illustrates a schematic diagram of one embodiment of this concept.

Thus, the travel time $T_{tvl}$ as described herein generally refers to the shortest time required for an extreme MrB event on any rotor blade(s) 22 to travel downstream of the rotor plane to ensure the following blade(s) 22 is not impacted. Such travel time may also be equal to the minimum time before the pitch commanded by the control algorithm described herein begins to decay to fine pitch. This travel time ensures that the extreme MrB event is far enough downstream to avoid impacting the following blade, being located a distance $D_{tvl}$ away from the blade where it has caused the extreme event.

Given the inverse relationship existing between the estimated wind speed and the travel time, and the fact that the processor(s) 58 does not operate until the wind turbine 10 cuts in, $T_{tvl}$ reaches its maximum at cut-in wind speed. However, the envelope-based MrB control algorithm is most likely to be active around nominal wind speed. Therefore, in an embodiment, as shown in the graph 600 of FIG. 13, the upper bound of this travel time can be set to the rated wind speed 602 of the wind turbine 10.

Given the travel time, $T_{tvl}$, the effective blade length, $L_{bld}^{eff}$, and the partial derivatives of the estimated thrust in terms of both the wind speed and the rotational speed, the MrB envelope prediction term can be calculated using Equation (9) below:

$$MrB_{env}^{pred} = \left[ T_{tvl} \cdot \max\left( 0, \frac{\partial FzAero}{\partial v}\dot{v} + \frac{\partial FzAero}{\partial \omega}\dot{\omega} \right) \right] \cdot L_{bld}^{eff} \qquad \text{Equation (9)}$$

Accordingly, the $MrB_{env}^{pred}$ prediction term is configured to adjust the MrB envelope by an amount equal to the predicted thrust $T_{tvl}$ in the future, allowing the processor(s) 58 to reach to and mitigate loads a short time in the future.

Referring back to FIG. 5, as shown at (110), the method 100 further includes calculating, via the processor(s) 58, an overall load envelope (e.g. $MrB_{env}$) of the blade root bending moment of the rotor blade(s) 22 as a function of the average load envelope and the future load estimation. For example, in an embodiment, the processor(s) 58 may be configured to calculate the overall load envelope of the blade root bending moment by summing the average load envelope $MrB_{env}^{filt}$ and the future load estimation $MrB_{env}^{pred}$. Thus, the full MrB envelope $MrB_{env}$, including the prediction term, may be calculated by the processor(s) 58 using Equation (10) below:

$$MrB_{env} = MrB_{env}^{filt} + MrB_{env}^{pred} \qquad \text{Equation (10)}$$

Thus, referring still to FIG. 5, as shown at (112), the method 100 includes implementing, via the processor(s) 58, a control action when the overall load envelope ($MrB_{env}$) is above a certain threshold. For example, in particular embodiments, the control action may include pitching the rotor blade(s) 22. More specifically, in such embodiments, pitching the rotor blade(s) 22 may include collective pitching of a plurality of rotor blades 22 of the wind turbine 10, independently pitching each of the plurality of rotor blades 22, cyclically pitching each of the plurality of rotor blades 22, fine pitching each of the plurality of rotor blades 22, or combinations thereof.

In particular embodiments, the method 100 may also include calculating the aerodynamic thrust that produces the given blade root bending moment at the effective blade length and determining a distance between the aerodynamic thrust and a corresponding threshold. Thus, in such embodiments, the method may include determining the control action based upon the distance between the aerodynamic thrust and the corresponding threshold and a hysteresis band.

For example, in particular embodiments, given the $MrB_{env}$ load envelope, the effective blade length $L_{bld}^{eff}$ described herein, the estimated blade root bending moment for tip-to-tower clearance control (e.g. $MyB_{TipC}$), the activation threshold (e.g. P_MrBThreshold) and the hysteresis band (e.g. $P_{MrBHysteresis}$), the processor(s) 58 can use Equations (11)-(14) to calculate the following equivalent thrust forces parameters:

$$FzAero_{eq}^{MrB_{env}} = \frac{MrB_{env}}{L_{bld}^{eff}} \qquad \text{Equation (11)}$$

$$FzAero_{eq}^{MrB_{threshold}} = \frac{\text{P\_MrBThreshold}}{L_{bld}^{eff}} \qquad \text{Equation (12)}$$

These are so-called equivalent thrust forces and are used by the processor(s) 58 to calculate the pitch required to mitigate MrB load exceedances. More specifically, in an embodiment, the thrust force(s) described herein create the blade root moment when imposed at $L_{bld}^{eff}$ and therefore must be calculated. Similarly, the thresholds are also expressed in terms of equivalent thrust forces to evaluate exceedance and hysteresis conditions.

The distance between such equivalent thrust forces and the corresponding thresholds, and the size of the hysteresis bands can then be calculated using Equations (13)-(14) below:

$$dMrB_{env} = FzAero_{eq}^{MrB_{env}} - FzAero_{eq}^{MrB_{threshold}} \qquad \text{Equation (13)}$$

$$HystMrB_{env} = P_{MrBHysteresis} \cdot FzAero_{eq}^{MrB_{threshold}} \qquad \text{Equation (14)}$$

Accordingly, the control algorithm of the processor(s) can take a different action based upon the size of these distances between actual moments and thresholds. In certain embodiments, a state-machine realization can be used to determine the appropriate control action, with states defined based upon the instantaneous value of the MrB envelope relative to the threshold and hysteresis band. For example, in one embodiment, as shown in FIG. 14, a graph of envelope-based MrB control is illustrated according to the present disclosure. More specifically, FIG. 14 illustrates how the envelope-based MrB control operates and displays the behavior of MrBPitch and FinePitch relative to the value of the MrB envelope compared to the threshold.

As shown, when the MrB envelope exceeds the threshold, the algorithm becomes active (MrBFlag=1) as it enters state 3. Here, MrBPitch is defined as an additional collective pitch signal equivalent to the load exceedance, calculated using the derivative of the thrust with respect to pitch. Moreover, when the algorithm is in state 3, the functionality may be temporarily disabled to prevent it from reducing the effectiveness of the envelope-based MrB control strategy in mitigating the extreme blade root loads.

As soon as the MrB envelope enters the hysteresis band (or falls below the threshold, in cases the hysteresis band is 0), the algorithm can switch to state 2 and a timer can begin to increment (this timer is reset in all other states). The processor(s) 58 can remain in this state if the envelope is within the hysteresis band and the timer remains in the below travel time, $T_{tvl}$. An additional condition then allows entering state 2 only if prior to this state the algorithm was in state 3 or exactly in state 2. Further, as shown in the illustrated embodiment, while in state 2, MrBPitch is held constant.

Once the MrB envelope is below the hysteresis band, the travel time has elapsed, and the previous state was either 2 or 1, the algorithm can exit state 2 and enters state 1. The MrBPitch begins to decay towards fine pitch, and the algorithm remains in state 1 until MrBPitch is within a certain degree, such as 0.05 degrees, of the fine pitch. At this point, the algorithm becomes inactive (MrBFlag=0) and enters state 0, where it remains until conditions to enter state 3 are satisfied.

The MrB envelope control algorithm also allows for defining a saturation level on MrBPitch via one or more parameters defined by the processor(s) 58. This represents the largest pitch angle the algorithm can request to prevent extreme MrB from exceeding the design limit in the extreme load case.

Various aspects and embodiments of the present invention are defined by the following numbered clauses:

Clause 1. A method for reducing loads acting on at least one rotor blade of a wind turbine, the method comprising:
  calculating, via a processor, a flapwise bending moment of the at least one rotor blade;
  calculating, via the processor, an edgewise bending moment of the at least one rotor blade;
  calculating, via the processor, an average load envelope of a blade root bending moment of the at least one rotor blade as a function of the flapwise bending moment and the edgewise bending moment of the at least one rotor blade;
  calculating, via the processor, an overall load envelope of the blade root bending moment of the at least one rotor blade as a function of the average load envelope and a future load estimation of the blade root bending moment of the at least one rotor blade; and,
  implementing, via the processor, a control action when the overall load envelope is above a certain threshold.

Clause 2. The method of clause 1, wherein calculating the flapwise bending moment further comprises calculating the flapwise bending moment as a function of an equivalent thrust acting on a rotor of the wind turbine and an overall length of the at least one rotor blade.

Clause 3. The method of clause 2, further comprising calculating the equivalent thrust acting on the rotor as a function of a thrust force, a rotor radius, and one or more processor variables, the one or more processor variables comprising at least one of a hub loading sensor measurement, d-q coordinate moments, or an aerodynamic location of where the thrust force is applied on the at least one rotor blade.

Clause 4. The method of any of the preceding clauses, wherein calculating the edgewise bending moment further comprises calculating the edgewise bending moment as a function of two or more of the following parameters: a mass of the at least one rotor blade, an acceleration due to gravity, a location of a center of gravity of the at least one rotor blade, a hub connection distance, a low-speed-shaft mechanical torque, a rotor radius, a partial derivative of a rotor rotation with respect to time, and a rotor inertia.

Clause 5. The method of any of the preceding clauses, wherein calculating the average load envelope of the blade root bending moment as a function of the flapwise bending moment and the edgewise bending moment further comprises summing the squares of the flapwise bending moment and the edgewise bending moment and calculating the square root of the sum of the squares.

Clause 6. The method of any of the preceding clauses, further comprising filtering the average load envelope of the blade root bending moment via at least one filter.

Clause 7. The method of clause 6, wherein filtering the average load envelope of the blade root bending moment via the at least one filter further comprises filtering the average load envelope of the blade root bending moment via two notch filters.

Clause 8. The method of clause 7, wherein the two notch filters are characterized by a transfer function comprising a gain attenuation, a damping factor, and a target frequency of the notch filters.

Clause 9. The method of any of the preceding clauses, further comprising predicting the future load estimation of the blade root bending moment by calculating a future load envelope of the blade root bending moment as a function of one or more partial derivatives of thrust with respect to wind speed and rotor speed, an effective length of the at least one rotor blade, and a travel time, the travel time equal to the shortest time required for an extreme blade root bending moment event on any rotor blade of the wind turbine to travel downstream of a rotor plane to ensure the following rotor blade is not impacted, the effective blade length corresponding to a location where an application of aerodynamic thrust produces a given blade root bending moment.

Clause 10. The method of clause 9, further comprising calculating the travel time as a function of a distance being traveled by wind downstream of a rotor of the wind turbine after any of the at least one rotor blades has experienced the extreme blade root bending moment event and an estimated wind speed.

Clause 11. The method of any of the preceding clauses, wherein calculating the overall load envelope of the blade root bending moment as a function of the average load envelope and the future load estimation further comprises summing the average load envelope and the future load estimation.

Clause 12. The method of clause 9, further comprising:
  calculating the aerodynamic thrust that produces the given blade root bending moment at the effective blade length; and,
  determining a distance between the aerodynamic thrust and a corresponding threshold.

Clause 13. The method of clause 12, further comprising determining the control action based upon the distance between the aerodynamic thrust and the corresponding threshold and a hysteresis band.

Clause 14. The method of any of the preceding clauses, wherein the control action comprises pitching one or more rotor blades of the wind turbine.

Clause 15. The method of clause 14, wherein the pitching the one or more rotor blades further comprises at least one of collective pitching of a plurality of rotor blades of the wind turbine, independently pitching each of the plurality of rotor blades, cyclically pitching each of the plurality of rotor blades, fine pitching each of the plurality of rotor blades, or combinations thereof.

Clause 16. A system for reducing loads acting on at least one rotor blade of a wind turbine, the system comprising:
- a controller comprising at least one processor configured to perform a plurality of operations, the plurality of operations comprising:
    - calculating a flapwise bending moment of the at least one rotor blade;
    - calculating an edgewise bending moment of the at least one rotor blade;
    - calculating an average load envelope of a blade root bending moment of the at least one rotor blade as a function of the flapwise bending moment and the edgewise bending moment of the at least one rotor blade;
    - filtering the average load envelope of the blade root bending moment via at least one filter;
    - calculating an overall load envelope of the blade root bending moment of the at least one rotor blade as a function of the average load envelope and a future load estimation of the blade root bending moment of the at least one rotor blade; and,
    - implementing a control action when the overall load envelope is above a certain threshold.

Clause 17. The system of clause 16, wherein calculating the flapwise bending moment further comprises calculating the flapwise bending moment as a function of an equivalent thrust acting on a rotor of the wind turbine and an overall length of the at least one rotor blade.

Clause 18. The system of clauses 16-17, wherein calculating the edgewise bending moment further comprises calculating the edgewise bending moment as a function of two or more of the following parameters: a mass of the at least one rotor blade, an acceleration due to gravity, a location of a center of gravity of the at least one rotor blade, a hub connection distance, a low-speed-shaft mechanical torque, a rotor radius, a partial derivative of a rotor rotation with respect to time, and a rotor inertia.

Clause 19. The system of clauses 16-18, wherein filtering the average load envelope of the blade root bending moment via the at least one filter further comprises filtering the average load envelope of the blade root bending moment via two notch filters.

Clause 20. The system of clauses 16-19, wherein the control action comprises pitching one or more rotor blades of the wind turbine, wherein pitching the one or more rotor blades further comprises at least one of collective pitching of a plurality of rotor blades of the wind turbine, independently pitching each of the plurality of rotor blades, cyclically pitching each of the plurality of rotor blades, fine pitching each of the plurality of rotor blades, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing loads acting on at least one rotor blade of a wind turbine, the method comprising:
    - calculating, via a processor, a flapwise bending moment of the at least one rotor blade;
    - calculating, via the processor, an edgewise bending moment of the at least one rotor blade;
    - calculating, via the processor, an average load envelope of a blade root bending moment of the at least one rotor blade as a function of the flapwise bending moment and the edgewise bending moment of the at least one rotor blade;
    - calculating, via the processor, an overall load envelope of the blade root bending moment of the at least one rotor blade as a function of the average load envelope and a future load estimation of the blade root bending moment of the at least one rotor blade; and
    - pitching, via the processor, one or more rotor blades of the wind turbine when the overall load envelope is above a certain threshold.

2. The method of claim 1, wherein calculating the flapwise bending moment further comprises calculating the flapwise bending moment as a function of an equivalent thrust acting on a rotor of the wind turbine and an overall length of the at least one rotor blade.

3. The method of claim 2, further comprising calculating the equivalent thrust acting on the rotor as a function of a thrust force, a rotor radius, and one or more processor variables, the one or more processor variables comprising at least one of a hub loading sensor measurement, or an aerodynamic location of where the thrust force is applied on the at least one rotor blade.

4. The method of claim 1, wherein calculating the edgewise bending moment further comprises calculating the edgewise bending moment as a function of two or more of the following parameters: a mass of the at least one rotor blade, acceleration due to gravity, a location of a center of gravity of the at least one rotor blade, a rotor shaft mechanical torque, a rotor radius, a partial derivative of a rotor rotation with respect to time, and a rotor inertia.

5. The method of claim 1, wherein calculating the average load envelope of the blade root bending moment as a function of the flapwise bending moment and the edgewise bending moment further comprises summing squares of the flapwise bending moment and the edgewise bending moment and calculating a square root of the sum of the squares.

6. The method of claim 1, further comprising filtering the average load envelope of the blade root bending moment via at least one filter.

7. The method of claim 6, wherein filtering the average load envelope of the blade root bending moment via the at least one filter further comprises filtering the average load envelope of the blade root bending moment via two notch filters.

8. The method of claim 7, wherein the two notch filters are characterized by a transfer function comprising a gain attenuation, a damping factor, and a target frequency of the notch filters.

9. The method of claim 1, further comprising predicting the future load estimation of the blade root bending moment by calculating a future load envelope of the blade root bending moment as a function of one or more partial derivatives of thrust with respect to wind speed and rotor speed, an effective length of the at least one rotor blade, and a travel time, the travel time equal to the shortest time required for an extreme blade root bending moment event on any rotor blade of the wind turbine to travel downstream of a rotor plane to ensure the following rotor blade is not impacted, the effective blade length corresponding to a location where an application of aerodynamic thrust produces a given blade root bending moment.

10. The method of claim 9, further comprising calculating the travel time as a function of a distance being traveled by wind downstream of a rotor of the wind turbine after any of the at least one rotor blades has experienced the extreme blade root bending moment event and an estimated wind speed.

11. The method of claim 1, wherein calculating the overall load envelope of the blade root bending moment as a function of the average load envelope and the future load estimation further comprises summing the average load envelope and the future load estimation.

12. The method of claim 9, further comprising:
calculating an aerodynamic thrust that produces the given blade root bending moment at the effective blade length; and,
determining a distance between the aerodynamic thrust and a corresponding threshold.

13. The method of claim 12, further comprising determining an amount of the pitching based upon a distance between the aerodynamic thrust and the corresponding threshold and a hysteresis band.

14. The method of claim 1, wherein the pitching the one or more rotor blades further comprises at least one of collective pitching of a plurality of rotor blades of the wind turbine, independently pitching each of the plurality of rotor blades, cyclically pitching each of the plurality of rotor blades, fine pitching each of the plurality of rotor blades, or combinations thereof.

15. A system for reducing loads acting on at least one rotor blade of a wind turbine, the system comprising:
a controller comprising at least one processor configured to perform a plurality of operations, the plurality of operations comprising:
calculating a flapwise bending moment of the at least one rotor blade;
calculating an edgewise bending moment of the at least one rotor blade;
calculating an average load envelope of a blade root bending moment of the at least one rotor blade as a function of the flapwise bending moment and the edgewise bending moment of the at least one rotor blade;
filtering the average load envelope of the blade root bending moment via at least one filter;
calculating an overall load envelope of the blade root bending moment of the at least one rotor blade as a function of the average load envelope and a future load estimation of the blade root bending moment of the at least one rotor blade; and
pitching one or more rotor blades of the wind turbine when the overall load envelope is above a certain threshold.

16. The system of claim 15, wherein calculating the flapwise bending moment further comprises calculating the flapwise bending moment as a function of an equivalent thrust acting on a rotor of the wind turbine and an overall length of the at least one rotor blade.

17. The system of claim 15, wherein calculating the edgewise bending moment further comprises calculating the edgewise bending moment as a function of two or more of the following parameters: a mass of the at least one rotor blade, acceleration due to gravity, a location of a center of gravity of the at least one rotor blade, a rotor shaft mechanical torque, a rotor radius, a partial derivative of a rotor rotation with respect to time, and a rotor inertia.

18. The system of claim 15, wherein filtering the average load envelope of the blade root bending moment via the at least one filter further comprises filtering the average load envelope of the blade root bending moment via two notch filters.

19. The system of claim 15, wherein pitching the one or more rotor blades further comprises at least one of collective pitching of a plurality of rotor blades of the wind turbine, independently pitching each of the plurality of rotor blades, cyclically pitching each of the plurality of rotor blades, fine pitching each of the plurality of rotor blades, or combinations thereof.

* * * * *